(12) United States Patent
Bashford et al.

(10) Patent No.: US 7,296,094 B2
(45) Date of Patent: Nov. 13, 2007

(54) CIRCUIT AND METHOD TO PROVIDE CONFIGURATION OF SERIAL ATA QUEUE DEPTH VERSUS NUMBER OF DEVICES

(75) Inventors: Patrick R. Bashford, Fort Collins, CO (US); Brian A. Day, Colorado Springs, CO (US); Jeffrey M. Rogers, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 409 days.

(21) Appl. No.: 10/923,326

(22) Filed: Aug. 20, 2004

(65) Prior Publication Data

US 2006/0041691 A1 Feb. 23, 2006

(51) Int. Cl.
G06F 3/00 (2006.01)
(52) U.S. Cl. .................... 710/2; 710/8; 710/10; 710/12
(58) Field of Classification Search .................... 710/8, 710/9, 15–19, 64–72
See application file for complete search history.

(56) References Cited

U.S. PATENT DOCUMENTS 5,881,311 A * 3/1999 Woods ........................... 710/4
6,880,022 B1 * 4/2005 Waldspurger et al. ......... 710/9
6,965,956 B1 * 11/2005 Herz et al. ..................... 710/74
2005/0027900 A1 2/2005 Pettey
2005/0166014 A1 * 7/2005 Kobayashi et al. ......... 711/112

* cited by examiner

Primary Examiner—Kim Huynh
Assistant Examiner—Jonathan R Plante
(74) Attorney, Agent, or Firm—Cochran, Freund & Young

(57) ABSTRACT

Disclosed is a system using a SAS host controller and SAS expanders to control multiple SATA end devices where the memory contained on the SAS host controller is fixed to ease the cost and power consumption of the SAS host controller device, but where there is an expanded ability to support additional SATA end devices by configuring the allowed native command queue depth to be smaller for each SATA end device, thus allowing more SATA end devices to be supported by a single SAS host controller. An embodiment of the invention has three possible preset configuration states: thirty-two SATA end devices with a native command queue depth of thirty-two; sixty-four SATA end devices with a native command queue depth of sixteen; and one-hundred-twenty-eight SATA end devices with a native command queue depth of eight.

4 Claims, 12 Drawing Sheets

CIRCUIT AND METHOD TO PROVIDE CONFIGURATION OF SERIAL ATA QUEUE DEPTH VERSUS NUMBER OF DEVICES

BACKGROUND OF THE INVENTION a. Field of the Invention

The present invention generally pertains to computers and more particularly to the use of multiple data storage devices on a single host controller to expand storage capabilities of a computer system.

b. Description of the Background

Integrated Drive Electronics and Advanced Technology Attachment (IDE/ATA) specifications have long been a primary technology in Personal Computer (PC) systems for communication and data transfer between the PC system and the attached data storage devices. IDE/ATA uses a parallel communication connection that allows for a relatively short cable length, and requires a large number of individual wires within the cable. To alleviate these problems the PC industry established the emerging Serial Advanced Technology Attachment (SATA) specification, which employs a serial communication connection that increases the cable length and reduces the number of wires within the cable.

Another emerging specification in the attached storage field is the Serial Attached SCSI (SAS) specification. The SAS specification is based on the Small Computer System Interface (SCSI) specification, which is a common alternative to the IDE/ATA specification for attaching storage devices to PC systems. SAS is similar to SATA with respect to cabling and communication speed. The SAS specification also incorporates the SATA specification, allowing a mix of multiple SAS and SATA end devices, managed with a single SAS host controller. The SAS host controller combined with SAS expanders can support a very large number of SATA end devices. SATA has approached the subject of supporting multiple end devices by adding definitions for a port multiplier to the SATA specification. The SATA port multiplier technology is more limited than the SAS specification in that the SATA port multiplier supports fewer end devices, and only supports SATA end devices.

A SAS host controller is not required to support Native Command Queuing (NCQ) for SATA end devices. However, a SAS host controller that supports NCQ SATA end device capabilities, must properly handle the NCQ features of the SATA end devices. Each SATA end device may have a maximum of thirty-two entries in the queue for Native Commands (NC). Queuing NC's (Native Commands) allows the SATA device to optimize the order of execution of the queued commands with respect to the end device's physical and logical limitations. For instance, two or more commands in the queue may access data stored physically close to each other on a hard disk. Thus, permitting the SATA device to get all of the data in one physical region at the same time, saving time by reducing the amount of mechanical movement necessary for seeking data by the reading head. The optimization can be based on the individual characteristics of the SATA end device, whether the SATA end device is a hard disk, optical drive, or some other attached storage device. The more queue entries (the queue depth), the better the end device can optimize the execution of the commands. However, the greater the queue depth, the more complicated the optimization logic becomes. Hence, as has been adopted by the SATA specification, the maximum queue depth has typically been limited to thirty-two queue entries.

The physical world limits the maximum number of SATA end devices that a SAS host controller can manage. The SAS host controller must physically and logically be able to manage all of the SATA end devices within the system. The number of devices a SAS host controller may access is limited by the number of physical cable connection ports on the SAS host controller combined with the number of physical cable connection ports available on any SAS expanders in the system. Using SAS expanders in a fanout fashion allows for an essentially infinite number of connections to SATA end devices using a single SAS host controller. The fanout configuration leaves the logical implementation of the SAS host controller as the primary limitation. Just as the SATA end device becomes more complicated with an increased NC queue depth, the SAS host controller also becomes more complicated as the NC queue depth is increased, since the SAS host controller must monitor the queues of each SATA end device. The SAS host controller must also manage the communication with each SATA end device. The larger the number of SATA end devices, the more memory resources and computing power is necessary for the SAS host controller to manage the attached storage system. The queue depth and the number of end devices multiplicatively increase the memory resource requirements and the computing power requirements of the SAS host controller. A typical SAS host controller has a fixed amount of memory and a fixed degree of computational power. Hence, typical SAS controllers fix the number of devices and the NC queue depth to match the memory and computational power of the SAS controller.

SUMMARY OF THE INVENTION

The present invention overcomes the disadvantages and limitations of the prior art by providing a single SAS host controller that functions as multiple standard SAS host controllers by trading off the supported number of SATA end devices and the supported NC (Native Command) queue depth for each SATA end device. Different preset combinations of the number of end devices and the queue depth settings are provided in a single SAS host controller, allowing the SAS host controller to act differently according to the various preset configuration settings. The preset configuration settings allow the same memory and computational resources of a SAS host controller to be utilized for various preset configurations that are tradeoffs between the number of SATA end devices and the NC queue depth of each SATA end device.

An embodiment of the present invention may therefore comprise a method of using a SAS host controller having a predetermined amount of memory and predetermined computational resources to manage a plurality of SATA end devices. The method comprises creating a plurality of preset configurations that establish the number of SATA end devices supported by the SAS host controller and a native command queue depth of each of the SATA end devices so that the predetermined amount of memory in the SAS host controller and the predetermined computational resources of the SAS host controller are sufficient to allow the SAS host controller to control the plurality of SATA end devices. The method further comprises selecting a preset configuration from the plurality of preset configurations in accordance with a desired number of the plurality of SATA end devices that are connected to the SAS host controller.

An embodiment of the present invention may further comprise a SAS host controller device that controls a plurality of SATA end devices. The device further comprises a multiplexer that generates a tag table index which is the concatenation of a device identification number identifying a SATA end device, and a native command queue command identifier representing a native command currently queued in the native command queue of the SATA end device. The concatenation is done in accordance with a selected configuration state provided by a configuration register so as to generate a concatenated tag table index signal. The device is further comprised of a native command pointer array that selects a native command pointer that is stored in the native command pointer array in response to the concatenated tag table index signal so as to deliver the native command pointer to the SAS host controller device. The device is also further comprised of a multiplexer that generates a SActive RAM table index which is a subset of the device identification number identifying the SATA end device. The subset of the device identification number is determined in accordance with the selected configuration state provided by the configuration register so as to generate a SActive RAM table index signal. The device is also further comprised of an array of SActive values that selects a chosen SActive value that is stored in the array of SActive values in response to the SActive RAM table index signal, wherein each SActive value of the array of SActive values is a block of native command queue status bits. The device is also further comprised of a logic algorithm that generates an adjusted SActive value which is a subset of the bits of the chosen SActive value. The subset of the bits of the chosen SActive value are determined in accordance with the device identification number and the configuration state provided by the configuration register, wherein the subset of bits of the chosen SActive value is shifted to the least significant bits of the chosen SActive value and the remaining bits of the chosen SActive value are given zero values so as to deliver the adjusted SActive value to the SAS host controller device.

DETAILED DESCRIPTION OF THE INVENTION

In order to control the cost of the SAS host controller it is necessary to control the memory and computational requirements utilized in making the SAS host controller. It is also beneficial to provide as much functionality as possible. Some SAS host controller users may want to support many SATA end devices, while other users may want to optimize the performance of each individual SATA end device by utilizing the largest NC (Native Command) queue depth possible. Some SATA end devices don't support the maximum NC queue depth so there may be no need for the SAS host controller to support the full NC queue depth. As the number of SATA end devices rises, the SAS host controller memory and computational resources rise as well. Similarly, when the NC queue depth of each SATA end device is increased, the SAS host controller memory and computational requirements increase as well. The SATA end device NC queue depth and the total number of SATA end devices act multiplicatively to increase the memory and computational requirements of the SAS host controller. Therefore, the memory and computational requirements of the SAS host controller can be controlled by adjusting either, or both, of the supported total number of SATA end devices and/or the supported NC queue depth for each SATA end device.

Figure 1:
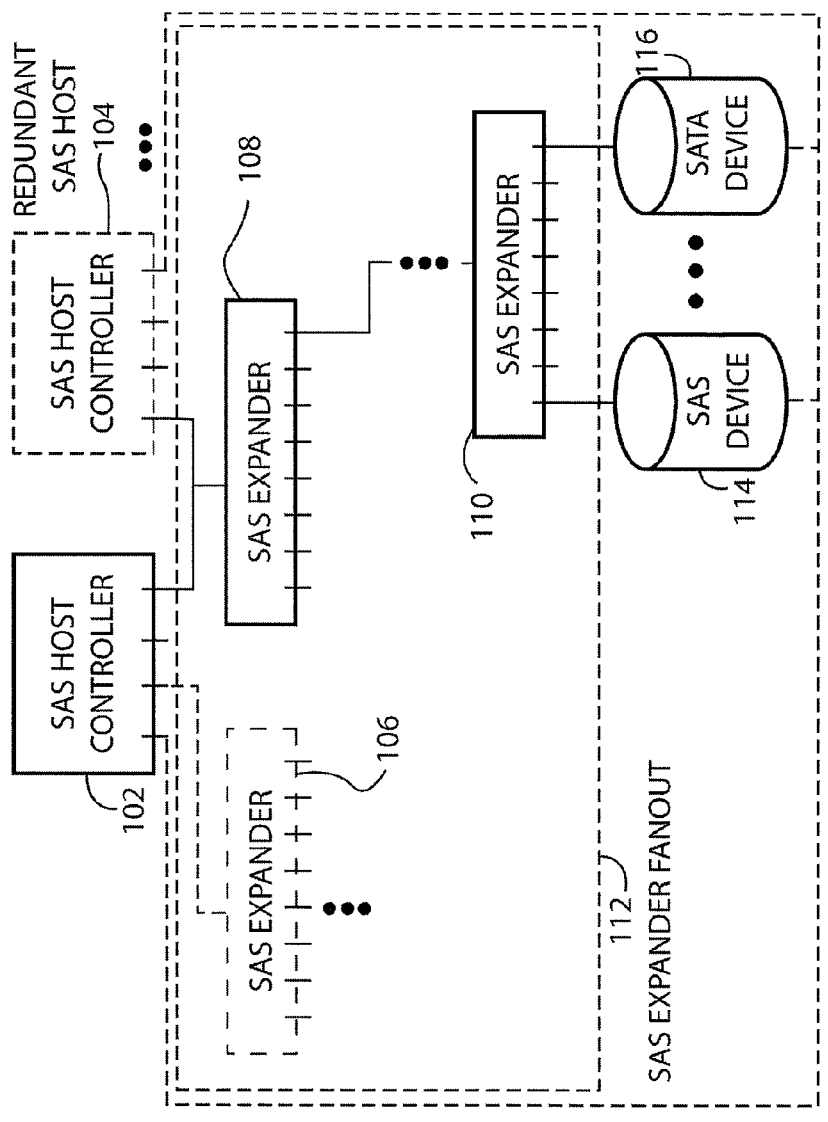
FIG. 1 is a schematic diagram of the architecture for a SAS/SATA combined multi-end device system.

FIG. 1 is a schematic diagram of the architecture for a SAS/SATA combined multi-end device system 100. The multi-end device system 100 consists of at least one SAS host controller 102. It is possible to have additional, redundant SAS host controllers 104 within the system 100. A SAS host controller 102, 104 may support one or more connections to SAS expanders 106, 108, and/or 110, or to connect directly to SAS 114 and/or SATA 116 end devices. As indicated by the four dash marks appearing on the bottom of each of the SAS host controllers 102, 104 shown in FIG. 1, the SAS host controllers 102, 104 shown here support four concurrent external device connections. That is, each mark on the bottom of the host controllers 102, 104 is representative of one physical external connection on an actual, physical SAS controller device. A SAS expander 106, 108, 110 supports many expansion connections going either up or down in the SAS expander fanout architecture 112. To make the concept clearer, there is only a single connection upward in the SAS fanout architecture 112 illustrated here. The SAS expanders 106, 108, 110 may be arranged in a multi-layered fanout fashion 112 so that the number of connected end devices 114, 116 can be very large. SAS expanders 106, 108 may connect to SAS host controllers 102, 104 in the layer above the SAS expander 106, 108. A SAS expander may also connect to one of the SAS expansion connections of a SAS expander in the fanout layer above or below the subject SAS expander.

The SAS/SATA combined multi-end device system architecture 100 is discussed in the SAS 1.0 specification documentation available to the public for use in designing and creating industry interoperable attached computer storage equipment. The SAS 1.0 specification is a product of the T10 technical committee of the International Committee on Information Technology Standards (INCITS) operating under rules that are approved by the American National Standards Institute (ANSI). ANSI is the United States representative on Joint Technical Committee-1 (JTC-1) of the International Standards Organization (ISO) and the International Electrotechnical Commission (IEC). The SAS 1.0 specification is listed as INCITS.376:2003. The SAS 1.0 specification does not discuss the specific algorithms and inner workings of the SAS host controller, or how the SAS host controller manages the multi-end device system 100. The SAS 1.0 specification simply codifies the physical connections between system 100 components and the information that must be read and written across these connections for each type of device within the system 100 in order to maintain interoperability between components created by different manufacturers.

Figure 2:
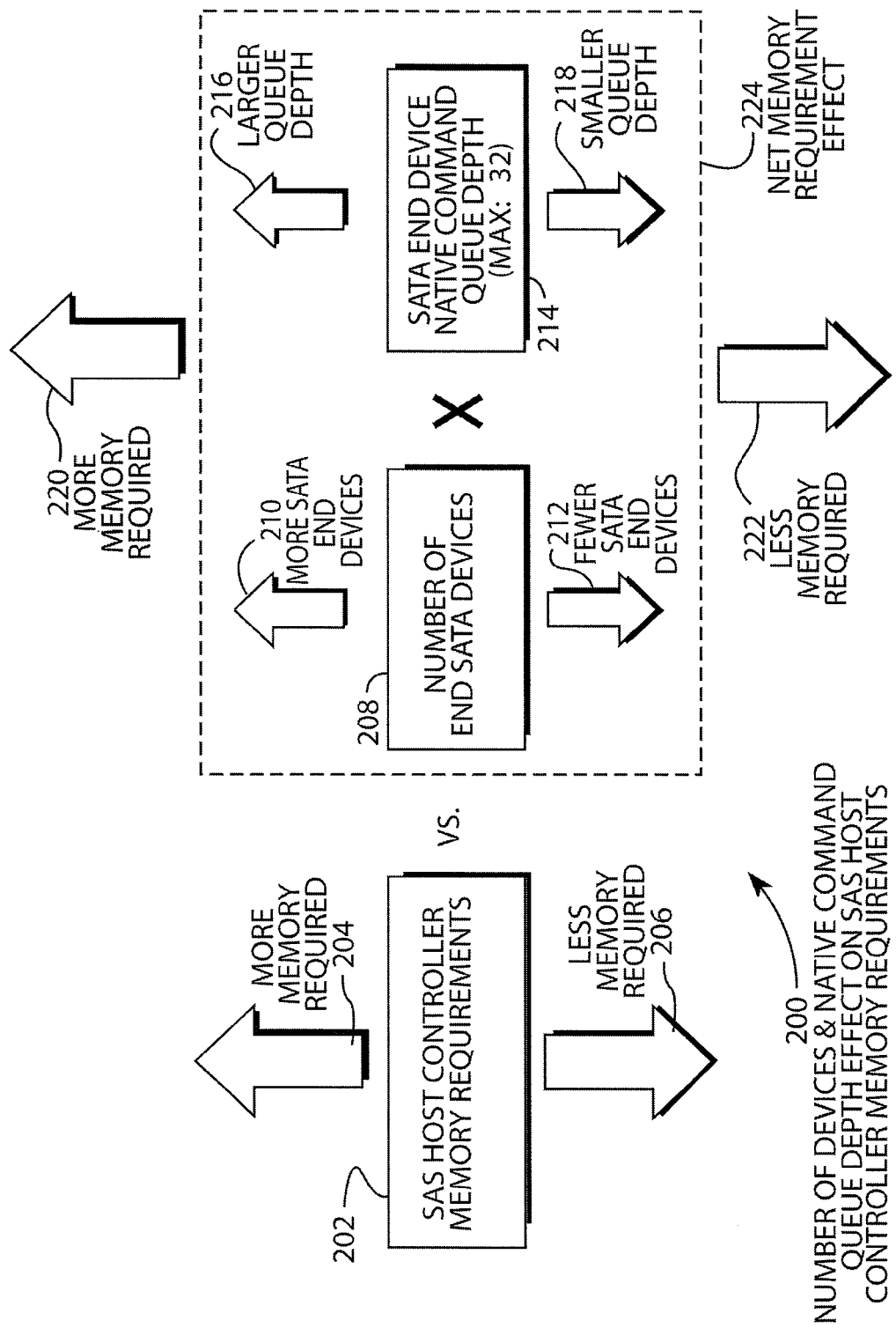
FIG. 2 is a schematic illustration showing the effect that changing the number of SATA end devices and/or the NC queue depth has on the SAS host controller memory requirements.

FIG. 2 is a schematic illustration 200 showing the effect that changing the number of SATA end devices 208 and/or the NCQ queue depth 214 has on the SAS host controller memory requirements 202. SAS end devices are managed separately by the SAS host controller, because the SAS end devices require different logic and control algorithms than the logic and control algorithms for SATA end devices. The SAS host controller must maintain a list of pointers to all commands for each NC queue entry on each SATA end device. The net memory requirements 224 for the SAS host controller 202 are, thus, directly proportional to the number of SATA end devices 208 multiplied times the NC queue depth 214 of each SATA end device. As the number of SATA end devices increases 210, the net memory requirements increase 220 as well. Similarly, when the NC queue depth for each SATA end device increases 216, the net memory requirements 220 for the SAS host controller increase as well. Likewise, if the number of SATA end devices decreases 212 and/or the NC queue depth for each SATA device decreases 218, the net memory required 222 for the SAS host controller decreases accordingly. Since the net memory requirement 224 is a multiple of the number of SATA end devices 208 times the NC queue depth for each SATA end device 214, adjusting these terms in opposite directions allows the net memory required 224 to remain unchanged. When the net memory required 224 increases or decreases, the SAS host controller memory 202 correspondingly increases or decreases. The increase 204 or decrease 206 in memory requirements for the SAS host controller directly affects the cost of the device because of the additional memory, as well as indirectly affecting the cost of the device due to the increased computational power required to manage more memory positions.

The NC queue depth 214 is a parameter specified by the SATA II: Extensions to SATA 1.0a specification. The specification stipulates a maximum queue depth of thirty-two. The SAS host controller is free to specify an equivalent, or lower, maximum queue depth as desired by the SAS host controller designer. The SATA II: Extensions to SATA 1.0a specification documentation is available to the public for use in designing and creating industry interoperable SATA end devices. The SATA II: Extensions to SATA 1.0a specification is a product of the Serial ATA Working Group. The SATA II: Extensions to SATA 1.0a specification discusses the external interface elements of the SATA device, not the actual inner workings of the SATA device or its host controller. The specified data includes the physical connection characteristics, and the format and timing of end device and host communications, but not the management of the algorithms or resources necessary to manage multiple SATA end devices. The SATA specification allows devices from different manufacturers to interoperate without overly limiting the technical innovation inherent in creating a competitive SATA product.

Figure 3:
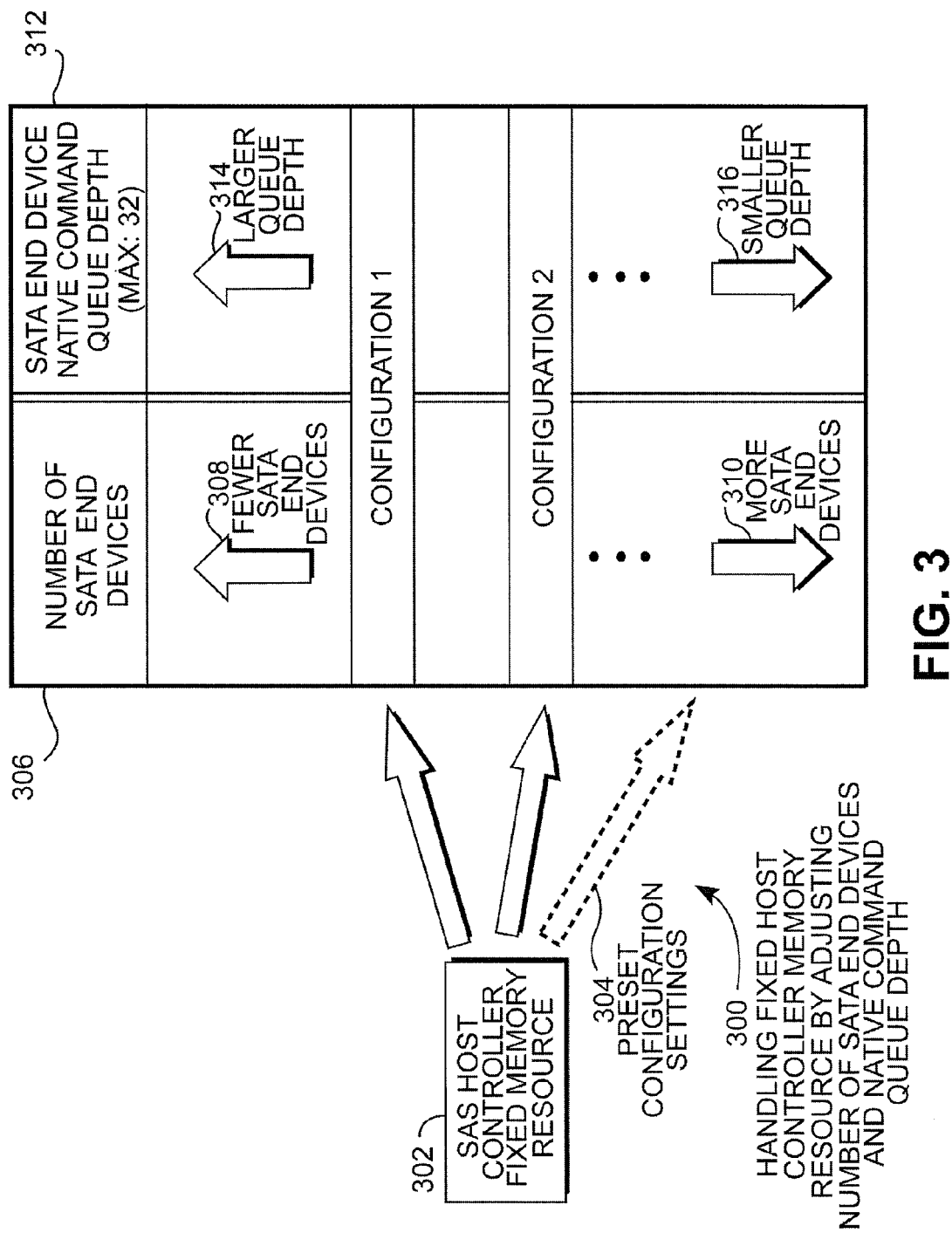
FIG. 3 is a schematic illustration showing the interaction between the number of SATA end devices and the NC queue depth when the SAS host controller memory size is fixed.

FIG. 3 is a schematic illustration 300 showing the interaction between the number of SATA end devices 306 and the NC queue depth 312 when the SAS host controller memory size is fixed 302. Since the SAS host controller memory size 302 is fixed, the number of SATA end devices 306 and the NC queue depth for each device 312 cannot change in such a way as to exceed the fixed memory resource of the SAS host controller 302. As the NC queue depth 314 becomes larger, there must be fewer SATA end devices 308 allowed. Conversely, when there are more SATA end devices 310, the NC queue depth 316 must be smaller. The specific values for the number of SATA end devices 306 and the NC queue depth 312 per SATA end device are preset configuration settings 304. For a typical SAS host controller, each of these preset configuration settings 304 could be a preset configuration for the SAS host controller, determining both the maximum number of SATA end devices, as well as the NC queue depth for each SATA end device supported by the SAS host controller. Different parameter settings require using different SAS host controllers for each of the disparate systems. For instance, absent the unique concepts of the present invention, a separate SAS host controller supporting each preset configuration would be required. The present invention uses a single SAS host controller to support multiple preset configuration settings 304.

Figure 4:
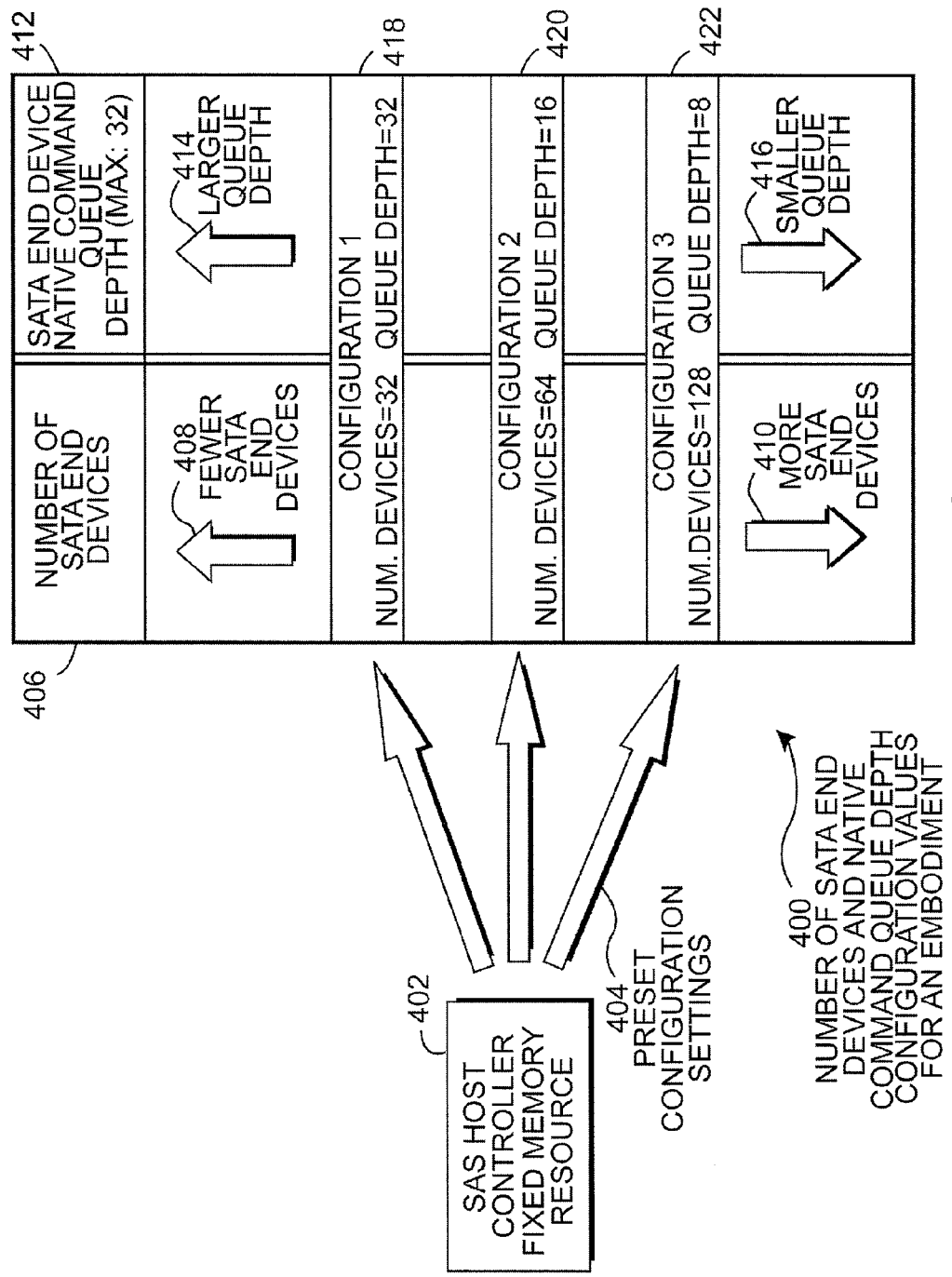
FIG. 4 is a schematic illustration showing the values of the number of SATA end devices and the NC queue depth for configuration states of an embodiment of a SAS host controller.

FIG. 4 is a schematic illustration 400 showing the values of the number of SATA end devices 406 and the NC queue depth 412 for configuration states of an embodiment of a SAS host controller. The fixed memory resources of the SAS host controller 402 restrict the allowable combination of values of the number of SATA end devices 406 and the NC queue depth per SATA end device 412. The larger the NC queue depth 414, the fewer SATA end devices are permitted 408. The smaller the NC queue depth 416, the more SATA end devices are allowed. The embodiment of the invention shown in FIG. 4 has three preset configuration settings 404. Configuration one (418) uses the SATA specification maximum NC queue depth of thirty-two, resulting in a maximum number of supported SATA end devices of thirty-two. Configuration two (420) has a NC queue depth of sixteen, thus, permitting the maximum number of SATA devices to be increased to sixty-four. Configuration three (422) has a NC queue depth of eight, thus, permitting the maximum number of SATA end devices to be one-hundred-twenty-eight. The SAS host controller user is permitted to select any of these configuration settings to best match the user's preference for more SATA end devices 410, or more optimized (faster) device operation with the larger NC queue depth 414. An embodiment does not have to have the same configuration states of the embodiment illustrated 400. The number of SATA end devices 406 and the NC queue depth 412 can be varied to any combination that matches the total SAS host controller fixed memory resources 402. Additionally, NC queue depth values do not have to be uniform among all SATA end devices. For instance, one SATA end device may have a NC queue depth of twenty-eight, while another device may have a NC queue depth of four. The net result of the NC queue depth combination of twenty-eight and four is a two to one memory reduction similar to configuration two (420).

Figure 5:
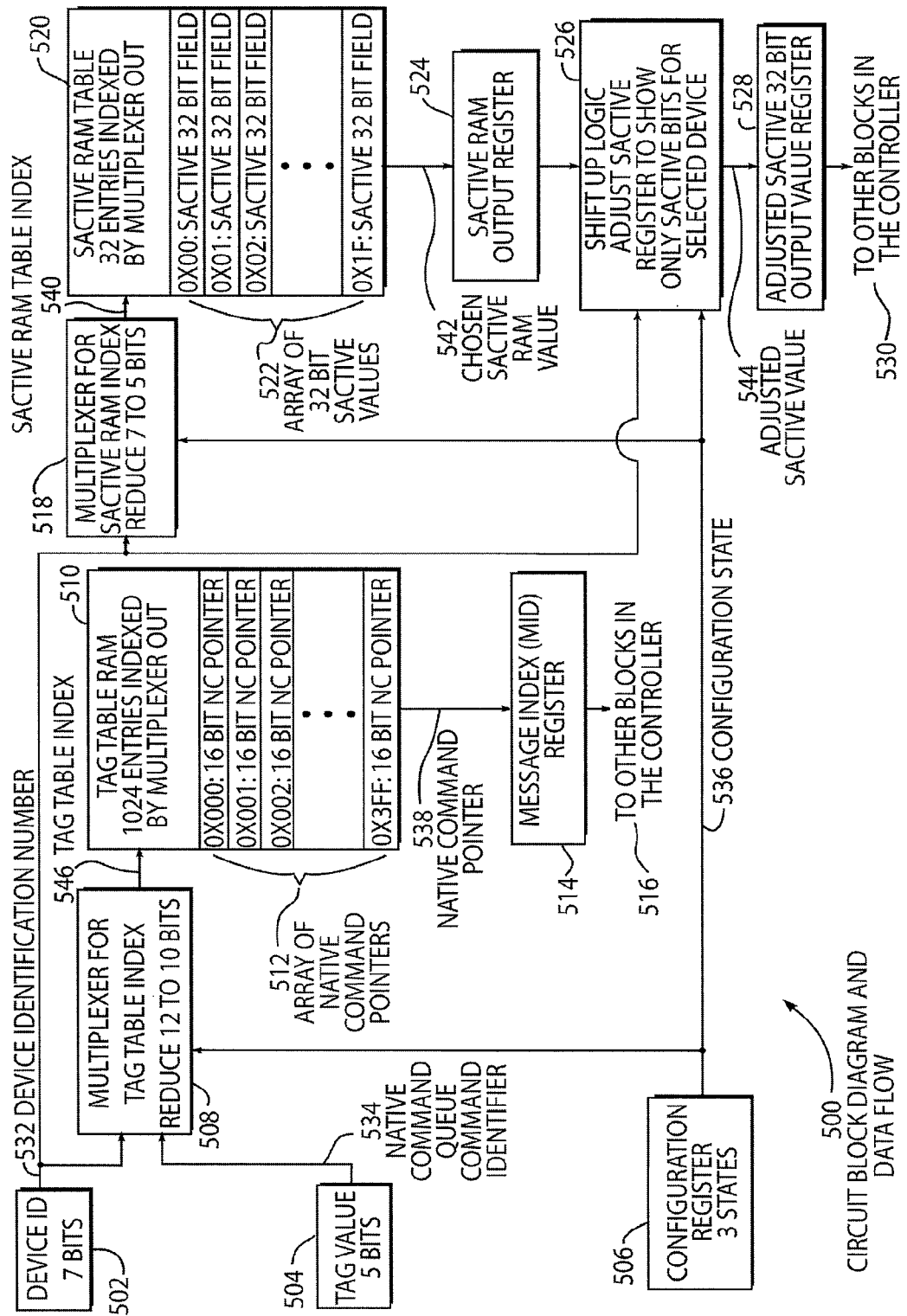
FIG. 5 is a circuit block diagram of a SAS host controller circuit and the associated data flow of the embodiment illustrated in FIG. 4.

FIG. 5 is a circuit block diagram 500 of the host controller circuit and the associated data flow of the embodiment illustrated in FIG. 4. One of the most difficult tasks in creating a configurable SAS host controller to manage SATA end devices is creating a fast and straightforward means to manage the commands and activity for all of the SATA end devices. The circuit block diagram and data flow schematic 500 describes just such an innovation. The circuit takes known values for the device identification 502, tag value 504, and configuration register state 506 and returns the appropriate NC pointer value 538 and NCQ status bits 528, 544 for use by other blocks within the SAS host controller 516, 530. The NC pointer 514, 538 and NCQ status bits 528, 544 values are necessary for the SAS host controller's management algorithms to manage the SATA end devices. The device identification 502, 532 is a seven bit value, ranging from zero to one-hundred-twenty-seven, that designates the individual SATA end device. The tag value 504, 534 is a five bit value ranging from zero to thirty-one corresponding to the NCQ command identifier 534 for the native command being processed. The NCQ command identifier 534 identifies a network command that is currently queued on the SATA end device. The SAS host controller is operating in one of three possible configuration states. The configuration register 506 indicates the current operating state of the SAS host controller.

To obtain the appropriate NC pointer for the chosen SATA end device, the multiplexer for the tag table index 508 combines the seven bit device identification 502, 532 with the five bit NCQ command identifier 504, 534 to obtain a ten bit tag table index 546 to a NC pointer value used to address the tag table RAM 510. The configuration state 536 determines which two, of the twelve possible bits, are removed by the multiplexer for the tag table index 508. The bit selection process is disclosed in more detail with respect to the description of FIG. 7. The output 546 of the multiplexer for the tag table index 508 is the tag table index 546 used to address the tag table RAM 510 and select the appropriate NC pointer value out of the array of NC pointer values array 512 contained in the tag table RAM 510. The array of NC pointer values 512 is a consecutive list of NC pointer values for each device, sub-categorized with the NC queue depth per SATA end device. The array of NC pointer values 512 architecture is disclosed in more detail with respect to the description of FIG. 6. The selected NC pointer value 538 is then placed in the message index register 514 where the NC pointer value 538 is available to other blocks in the SAS host controller 516 for further processing. A NC pointer value is a pointer to the specific command information for a SATA end device operation. Typically, but not always, the NC pointer value points to a command structure stored in the main memory of the host PC system.

To obtain the correct values of the SActive NCQ status bits for the chosen SATA end device, the multiplexer for the SActive RAM index 518 reduces the seven bit device identification 502, 532 to five bits. The two bits removed are determined by the current configuration state 536. The bit selection process is disclosed in more detail with respect to the description of FIG. 9. The output 540 of the multiplexer for the SActive RAM index 518 is the SActive RAM table index 540 used to address the SActive RAM table 520 and select the chosen thirty-two bit SActive RAM value 542 from the array of SActive values 522. Depending on the configuration state 536, only some of the thirty-two bits in the SActive RAM entry apply to the chosen SATA end device.

The shift up logic block 526 is used to obtain the correct SActive NCQ status bits from the chosen thirty-two bit SActive value 542 addressed by the SActive RAM table index 540. The chosen SActive value 542 is stored in the SActive RAM output register 524 for use by the shift up logic block 526. The process of how the SActive RAM table 520 array of SActive values 522 is configured for each configuration state of the embodiment is disclosed in more detail with respect to the description of FIG. 8. The logic of how the bits are adjusted to account for the three configuration states of the embodiment is disclosed in more detail with respect to the descriptions of FIG. 10, FIG. 11, and FIG. 12. The output of the shift up logic block 544 is an adjusted thirty-two bit SActive value 544 made up of NCQ status bits, with the unused NCQ status bits set to zero. The adjusted NCQ status bits that make up the adjusted SActive value 544 are placed in the adjusted SActive thirty-two bit output value register 528 where the adjusted SActive value 544 is available to other blocks in the controller 530 for further processing.

The embodiment that is disclosed with respect to the description of FIG. 5 may be varied. The order of data processing, memory architecture, configuration states, and fixed memory resources may all vary. The maximum number of SATA end devices and the NC queue depth supported by the SAS host controller may vary within the constraints of the SAS host controller fixed memory and computational resources. The SAS host controller fixed memory and computational resources may vary as well. The maximum number of SATA end devices and the NC queue depth supported by the SAS host controller may be any number, not just numbers that are powers of two. Also, the NC queue depth does not need to be a uniform value for all SATA end devices. That is, the NC queue depth may be varied for each individual SATA end device in the system.

Figure 6:
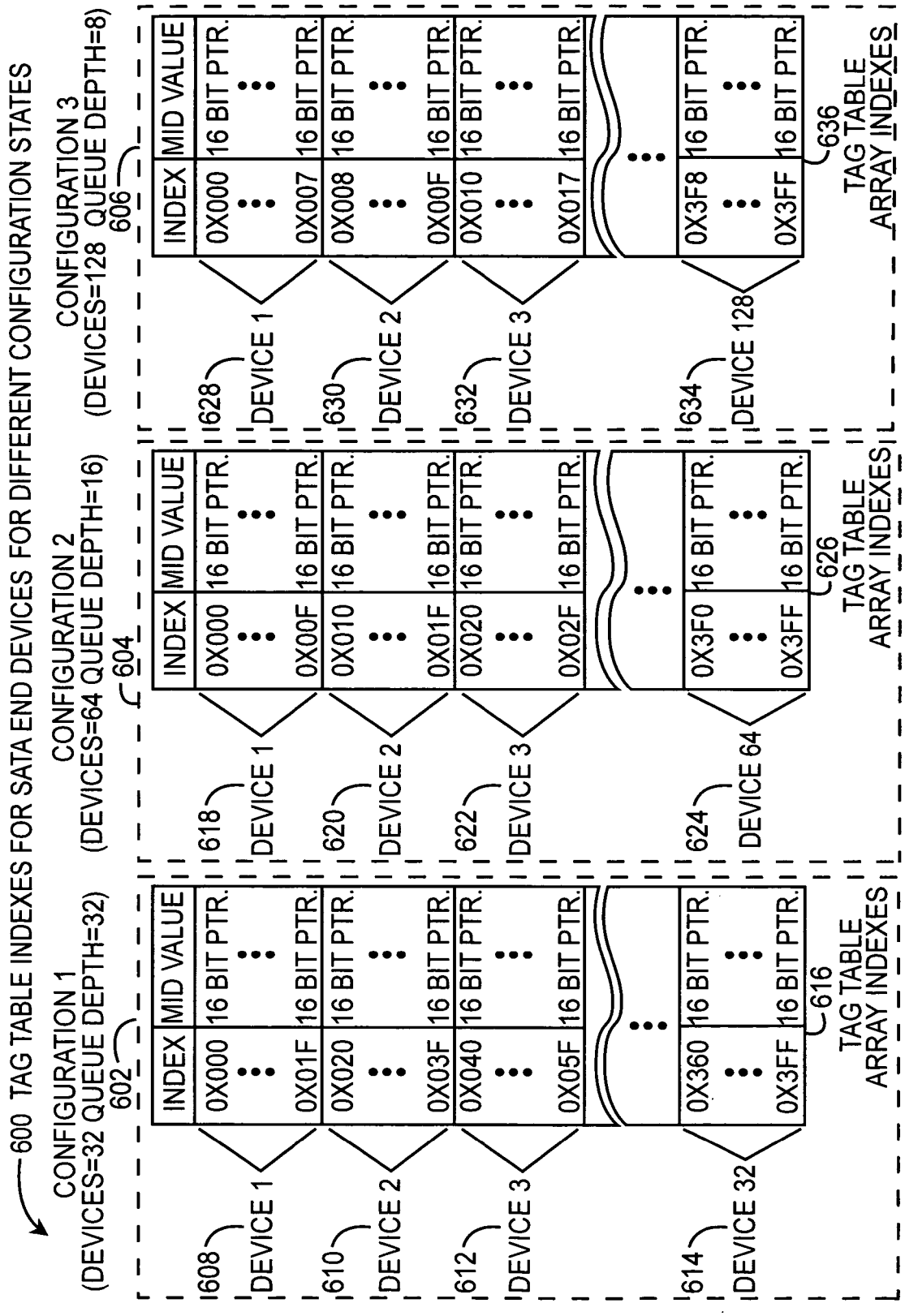
FIG. 6 is a schematic diagram showing the assigned tag table indexes for SATA end devices for the configuration states of the embodiment illustrated in FIG. 5.

FIG. 6 is a schematic diagram 600 showing the assigned tag table indexes for SATA end devices for the configuration states of the embodiment illustrated in FIG. 5, 510. The embodiment 600 has three preset configuration states: preset configuration state one (602) allowing a maximum of thirty-two devices with a NC queue depth of thirty-two; preset configuration state two (604) allowing a maximum of sixty-four devices with a NC queue depth of sixteen; and preset configuration state three (606) allowing a maximum of one-hundred-twenty-eight devices with a NC queue depth of eight. For preset configuration state one (602), the tag table array indexes (616) for each device are sequentially organized blocks of thirty-two NC pointer values. SATA end device one (608) uses the indexes starting at zero and extending to index thirty-one (0x01F in hex). SATA end device two (610) uses the block of data sequentially following SATA end device one (608). SATA end device three (612) data follows SATA end device two (610) data, and so on until SATA end device thirty-two (614) uses the last data block in the tag table array of indexes 616. Preset configuration state two (604) uses a similar tag table array of indexes 626, except each SATA end device is allocated a block of sixteen indexes, instead of a block of thirty-two indexes as permitted in preset configuration state one (602). The NC queue depth for preset configuration state two (604) is set to sixteen to match the block of sixteen indexes allocated for each SATA end device NC queue location. For preset configuration state two (604), SATA end device one (618) uses the indexes starting at zero and extending to index fifteen (0x00F in hex). SATA end device two (620) uses the block of data sequentially following SATA end device one (618). SATA end device three (622) data follows SATA end device two (620) data, and so on until SATA end device sixty-four (624) uses the last data block in the tag table array of indexes 626. Preset configuration state three (606) uses a sequentially organized tag table array of indexes 636 in a similar fashion as preset configuration state one (602) and preset configuration state two (604), but each block of data consists of eight indexes reserved for each SATA end device. For preset configuration three, SATA end device one (628) uses the indexes starting at zero and extending to index seven (0x007 in hex). SATA end device two (630) uses the block of data sequentially following SATA end device one (628). SATA end device three (632) data follows SATA end device two (630) data, and so on until SATA end device one-hundred-twenty-eight (634) uses the last data block in the tag table array of indexes 636.

Figure 7:
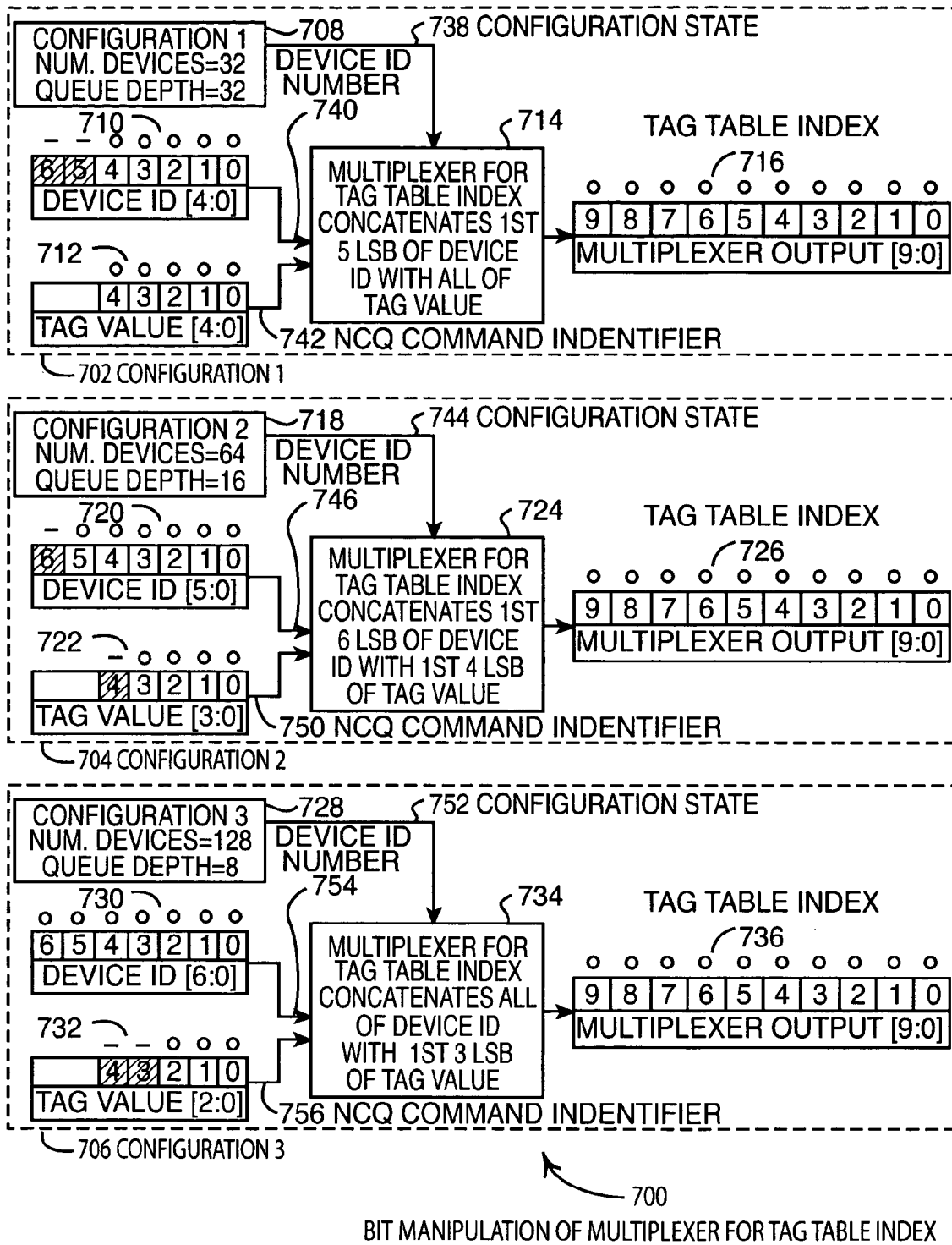
FIG. 7 is a schematic diagram illustrating the specific bit manipulation method used in the multiplexer for the tag table index for the configuration states of the embodiment illustrated in FIG. 5.

FIG. 7 is a schematic diagram 700 illustrating the specific bit manipulation method used in the multiplexer for the tag table index for the configuration states of the embodiment illustrated in FIG. 5, 508. The bit manipulation disclosed in FIG. 7 is used to create the indexes to address the tag table memory as the tag table memory architecture is disclosed with respect to FIG. 6. For preset configuration state one (702), the multiplexer for the tag table index 714 takes data input from the seven bit device identification 710, 740 and the five bit tag value 712 (equivalent to the NCQ command identifier 742) and combines the value into a single ten bit multiplexer output 716. The configuration state input 708, 738 is a managerial input to determine which bits from the data inputs are used. The multiplexer output 716 is used as the index into the tag table RAM. In preset configuration state one (702), the two bits removed from the twelve bit concatenation are the two Most Significant Bits (MSB) of the device identification 710, 740, since the two MSB of the device identification number 710, 740 are only needed to address SATA end device numbers greater than thirty-two. Thus, the multiplexer for the tag table index 714 combines the five Least Significant Bits (LSB) of the device identification 710, 740 with all bits of the NCQ command identifier 712, 742. For preset configuration state two (704), the multiplexer for the tag table index 724 uses the managerial configuration state 718, 744 to determine that the first MSB for both the device identification 720, 746 and the NCQ command identifier 722, 750 should be removed. Because the device identification 720, 746 need only address sixty-four SATA end devices, only the first six LSB of the device identification 720, 746 are necessary. Similarly, the NCQ command identifier 722, 750 need only address a block of sixteen NC pointer values, so only the four LSB of the NCQ command identifier 722, 750 are needed. The combined value becomes the tag table multiplexer 724 output 726 used to locate NC pointer values in the tag table RAM. For preset configuration state three (706), the multiplexer for the tag table index 734 uses the managerial configuration state 728, 752 to determine that the first two MSB for the NCQ command identifier 732, 756 should be removed. Because the device identification 730, 754 needs to address one-hundred-twenty-eight SATA end devices, all of the device identification 730, 754 bits are necessary. The NCQ command identifier 732, 756 need only address a block of sixteen NC pointer values, so only the three LSB of the NCQ command identifier 732, 756 are needed. The combined value of the device identification 730 and the three LSB of the tag value 732 becomes the tag table multiplexer 734 output 736 used to locate NC pointer values in the tag table.

Figure 8:
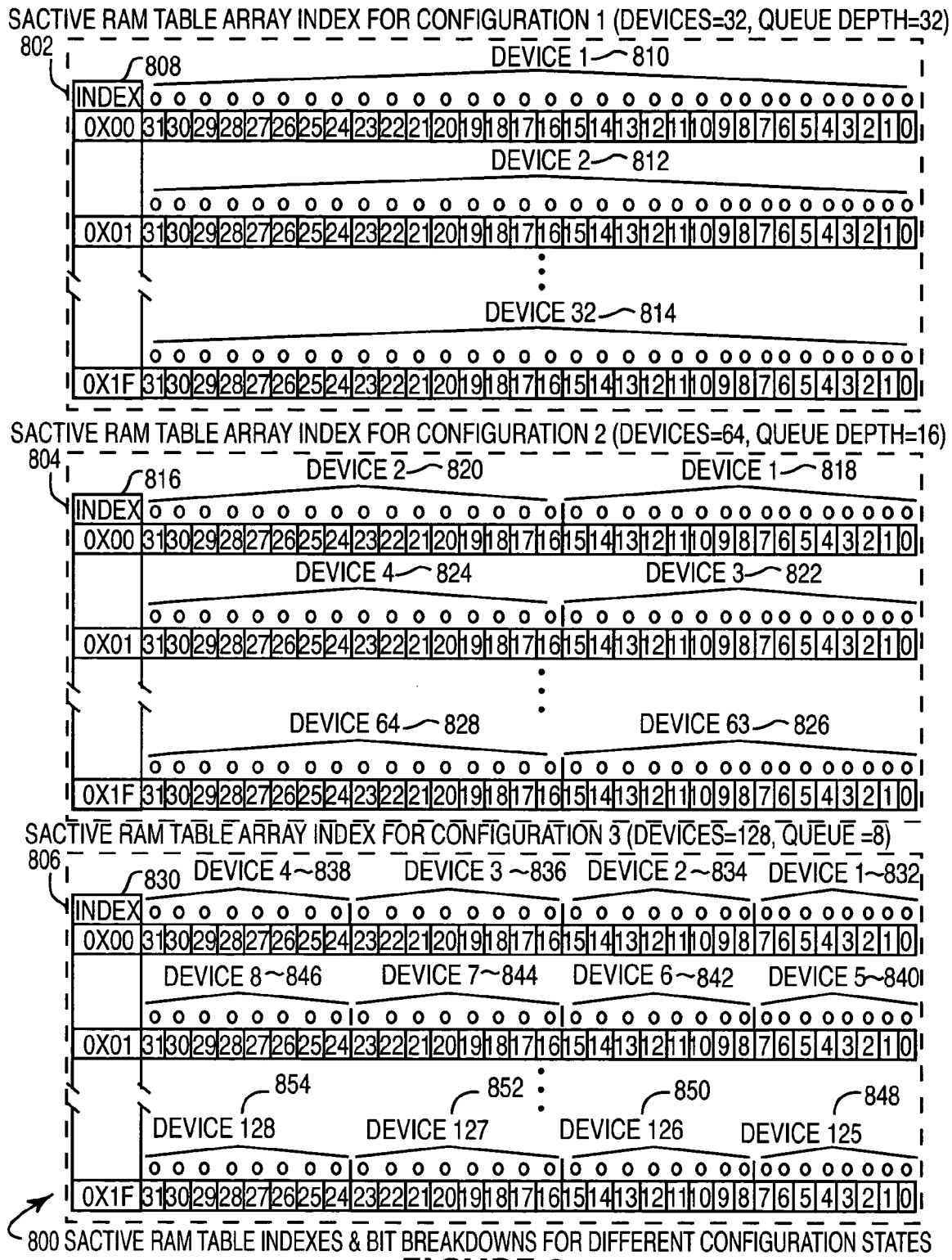
FIG. 8 is a schematic diagram illustrating the assigned indexes and subordinate bit locations for SActive status bits of SATA end devices for the configuration states of the embodiment illustrated in FIG. 5.

FIG. 8 is a schematic diagram 800 illustrating the assigned indexes and subordinate bit locations for SActive status bits of SATA end devices for the configuration states of the embodiment illustrated in FIG. 5, 520. Each SATA end device has a status bit to indicate whether the queue command is active (command waiting to be performed) or inactive (command completed or unused queue location). According to the SATA specification each device can have a maximum of thirty-two commands queued. Hence, there are thirty-two corresponding SActive status bits for each possible queued command. The SActive RAM table 808, 816, 830 is an array of thirty-two bit values, where each bit in a single thirty-two bit table entry corresponds to the SActive status bits for one, or more, SATA end devices. For preset configuration state one (802), each entry in the SActive RAM table 808 corresponds to a single SATA end device since the SAS host controller supports thirty-two queued commands per SATA end device. SATA end device one (810) uses all thirty-two bits of SActive RAM table 808 entry zero (0x00 hex). SATA end device two (812) uses all thirty-two bits of SActive RAM table entry one (0x01 hex), and so on until SATA end device thirty-two (814) uses all thirty-two bits of SActive RAM table entry thirty-one (0x1F hex). Preset configuration state two (804) reduces the supported queue depth to sixteen, thus, a single SActive RAM table entry would leave the sixteen MSB of the entry unused if the SActive RAM table 816 were to have sixty-four entries instead of thirty two entries. In order to save memory, the data for two SATA end devices is packed into a single entry of the SActive RAM table 816. SATA end device one (818) uses bits zero to fifteen, and SATA end device two (820) uses bits sixteen to thirty-one of SActive RAM table 816 entry zero (0x00 hex). SActive RAM table 816 entry one (0x01 hex) is made up of the SActive status bits for SATA end device three (822) contained in bits zero to fifteen, and the SActive status bits for SATA end device four (824) contained in bits sixteen to thirty-one. A similar structure of SActive RAM table entries is repeated until SActive RAM table 816 entry thirty-one (0x1F hex), which holds the SActive status bits for SATA end device sixty-three (826) in bits zero to fifteen, and the SActive status bits for SATA end device sixty-four in bits sixteen to thirty-one (828). Preset configuration state three (806) is similar to preset configuration state two (804), except that each SActive RAM table 830 entry is divided to hold SActive status bits for four SATA end devices. For SActive RAM table 830 entry zero (0x00 hex), SATA end device one (832) uses bits zero to seven, SATA end device two (834) uses bits eight to fifteen, SATA end device three (836) uses bits sixteen to twenty-three, and SATA end device four (838) uses bits twenty-four to thirty-one. SActive RAM table 830 entry one (0x01) is similarly organized to hold the SActive bits for SATA end device five (840), SATA end device six (842), SATA end device seven (844), and SATA end device eight (846). The SActive RAM table 830 entries continue to progress with similar SActive status bit structures until SActive RAM table 830 entry thirty-one (0x1F hex), which contains the SActive bits for SATA end device one-hundred-twenty-five (848) in bits zero to seven, SATA end device one-hundred-twenty-six (850) in bits eight to fifteen, SATA end device one-hundred-twenty-seven (852) in bits sixteen to twenty-three, and SATA end device one-hundred-twenty-eight (854) in bits twenty-four to thirty-one.

Figure 9:
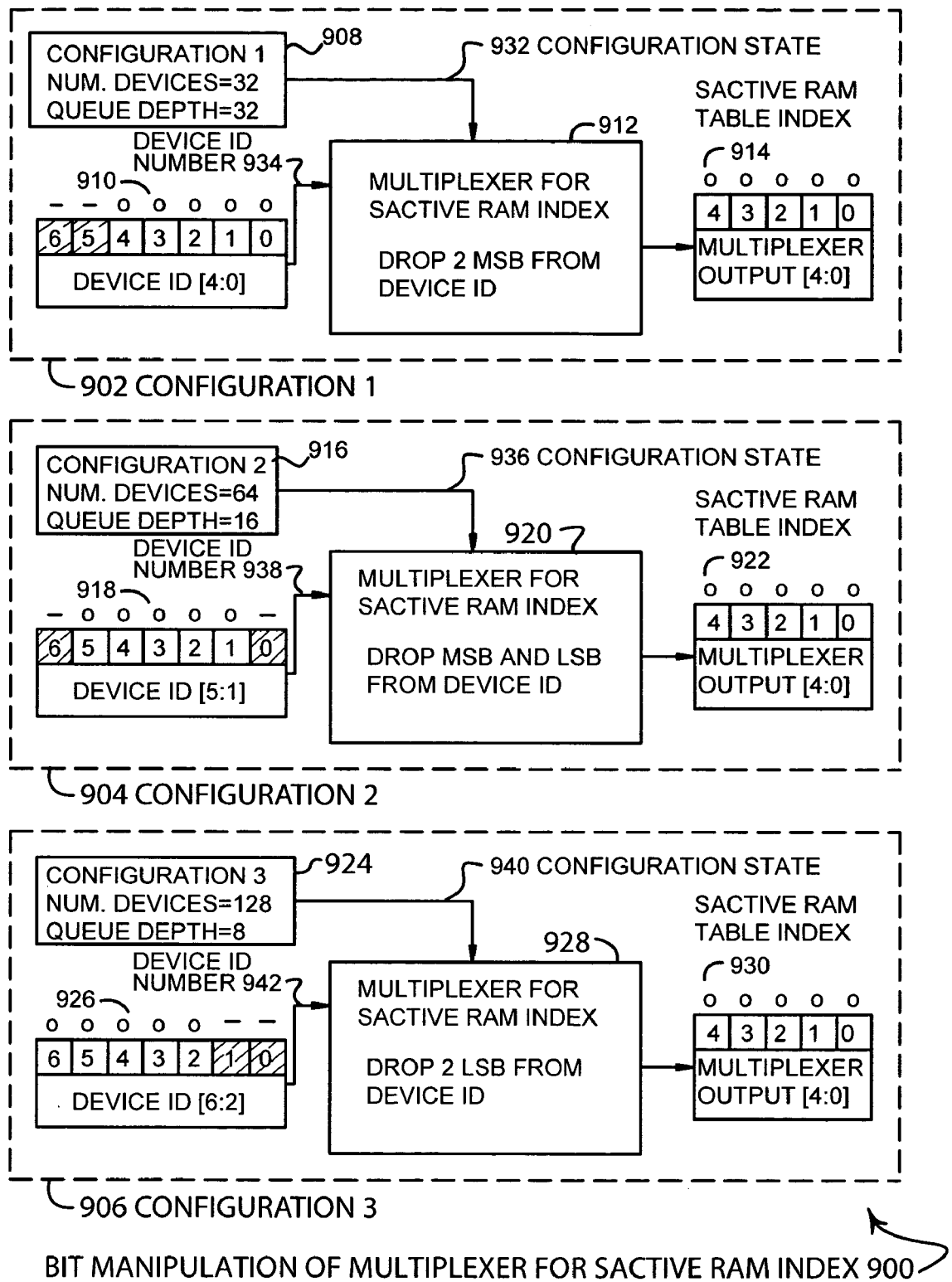
FIG. 9 is a schematic diagram illustrating the specific bit manipulation method used in the multiplexer for the SActive RAM index for the configuration states of the embodiment illustrated in FIG. 5.

FIG. 9 is a schematic diagram 900 illustrating the specific bit manipulation method used in the multiplexer for the SActive RAM index for the configuration states of the embodiment illustrated in FIG. 5, 518. The bit manipulation disclosed in FIG. 9 is used to create the indexes to address the SActive RAM table memory as the SActive RAM table memory architecture is disclosed with respect to FIG. 8. For a preset configuration state one (902), the multiplexer for the SActive RAM index 912 receives data input from the seven bit device identification 910, 934, and reduces the value to a five bit multiplexer output 914. The configuration state input 908, 932 is a managerial input to determine which bits from the device identification 910, 934 are used. The multiplexer output 914 is used to address the SActive RAM table. In preset configuration state one (902), the two bits removed from the device identification are the two MSB of the device identification 910, 934 since the two MSB of the device identification 910, 934 are only needed to address device numbers greater than thirty-two. For preset configuration state two (904), the multiplexer for the SActive RAM table index 920 uses the managerial configuration state 916, 936 to determine that the first MSB and the first LSB of the device identification 918, 938 are removed. Because the device identification 918, 938 need only address sixty-four devices, the first MSB of the device identification 918, 938 is not needed. The device identification 918, 938, minus the first MSB and minus the first LSB, thus, becomes the multiplexer output 922 used to locate the thirty-two bit SActive RAM value in the SActive RAM table. The first LSB of the device identification 918, 938 is used by the shift up logic block to locate the appropriate SActive status bits within the thirty-two bit value stored in the chosen SActive RAM value as is disclosed in more detail with respect to the description of FIG. 11. For preset configuration state three (906), the multiplexer for the SActive RAM table index 928 uses the managerial configuration state input 924, 940 to determine that the first two LSB for the device identification 926, 942 should be removed. Because the device identification 926, 942 needs to address up to one-hundred-twenty-eight devices all five of the MSB for the device identification 926, 942 are necessary. Hence, the five MSB of the device identification input 926, 942 becomes the multiplexer output 930 used to locate the chosen thirty-two bit SActive value in the SActive RAM table. The two LSB of the device identification 926, 942 are used by the shift up logic block to locate the appropriate SActive status bits within the chosen thirty-two bit SActive value, as is disclosed in more detail with respect to the description of FIG. 12.

Figure 10:
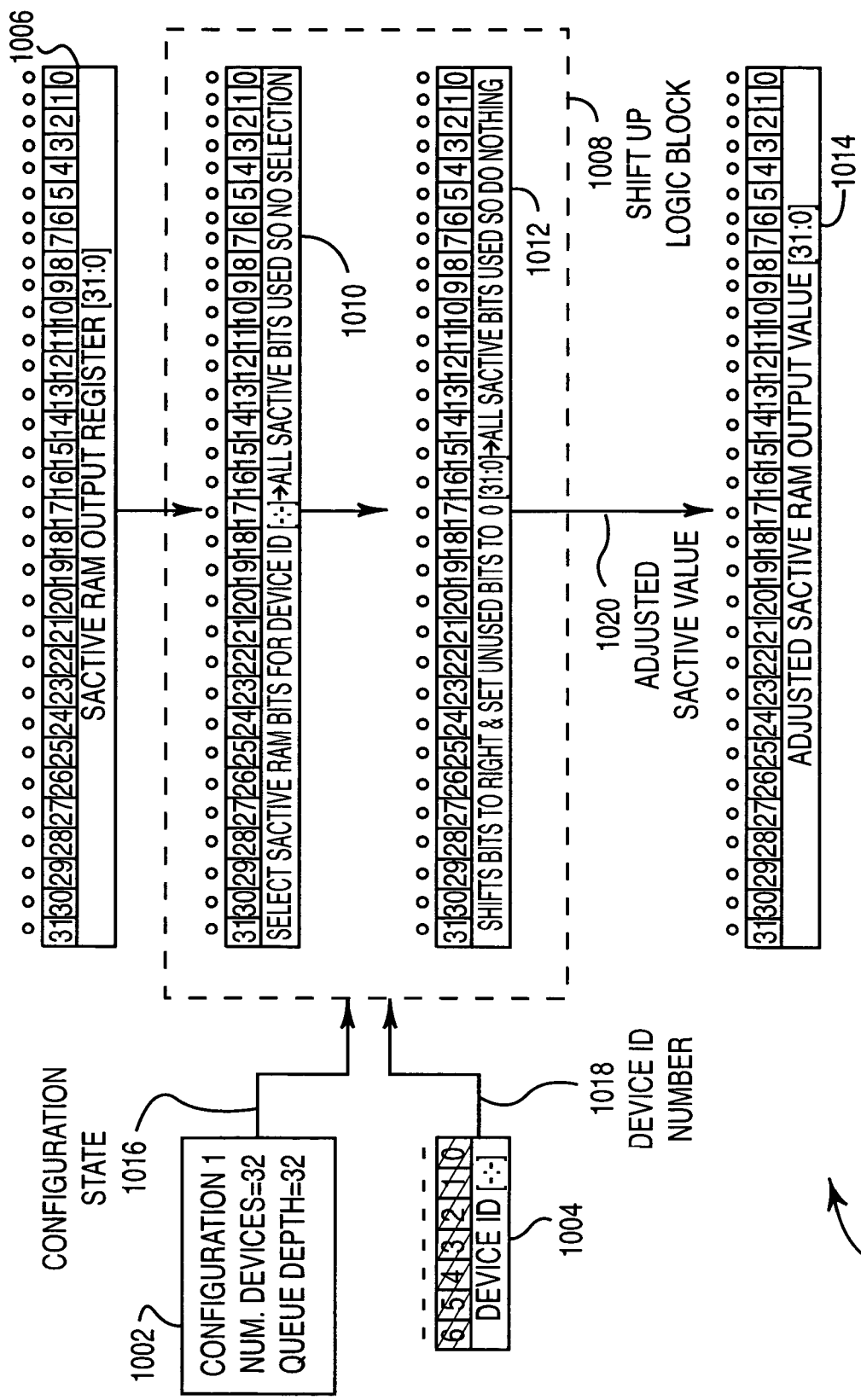
FIG. 10 is a schematic diagram illustrating the specific bit manipulation method used in the shift up logic block for a first configuration state of the embodiment illustrated in FIG. 5.

FIG. 10 is a schematic diagram 1000 illustrating the specific bit manipulation method used in the shift up logic block for a first configuration state of the embodiment illustrated in FIG. 5, 526. For preset configuration state one (1002, 1016) the entire thirty-two bit SActive RAM output register 1006 is used to hold the SActive status bits of the thirty-two queued commands available for a single SATA end device. The device identification 1004, 1018 is not needed for preset configuration state one (1002, 1016). The shift up logic block 1008 allows the SActive RAM output register 1006 to pass through the shift up logic block 1008 without making any changes. Within the shift up logic block 1008 all thirty-two bits are selected 1010 and the device identification 1004, 1018 has no effect on the adjusted SActive RAM output value 1014, 1020. Because all thirty-two bits are being used, none of the bits need to be shifted to the right 1012. The adjusted SActive RAM output value 1014, 1020 is the same as the SActive RAM output register 1006.

Figure 11:
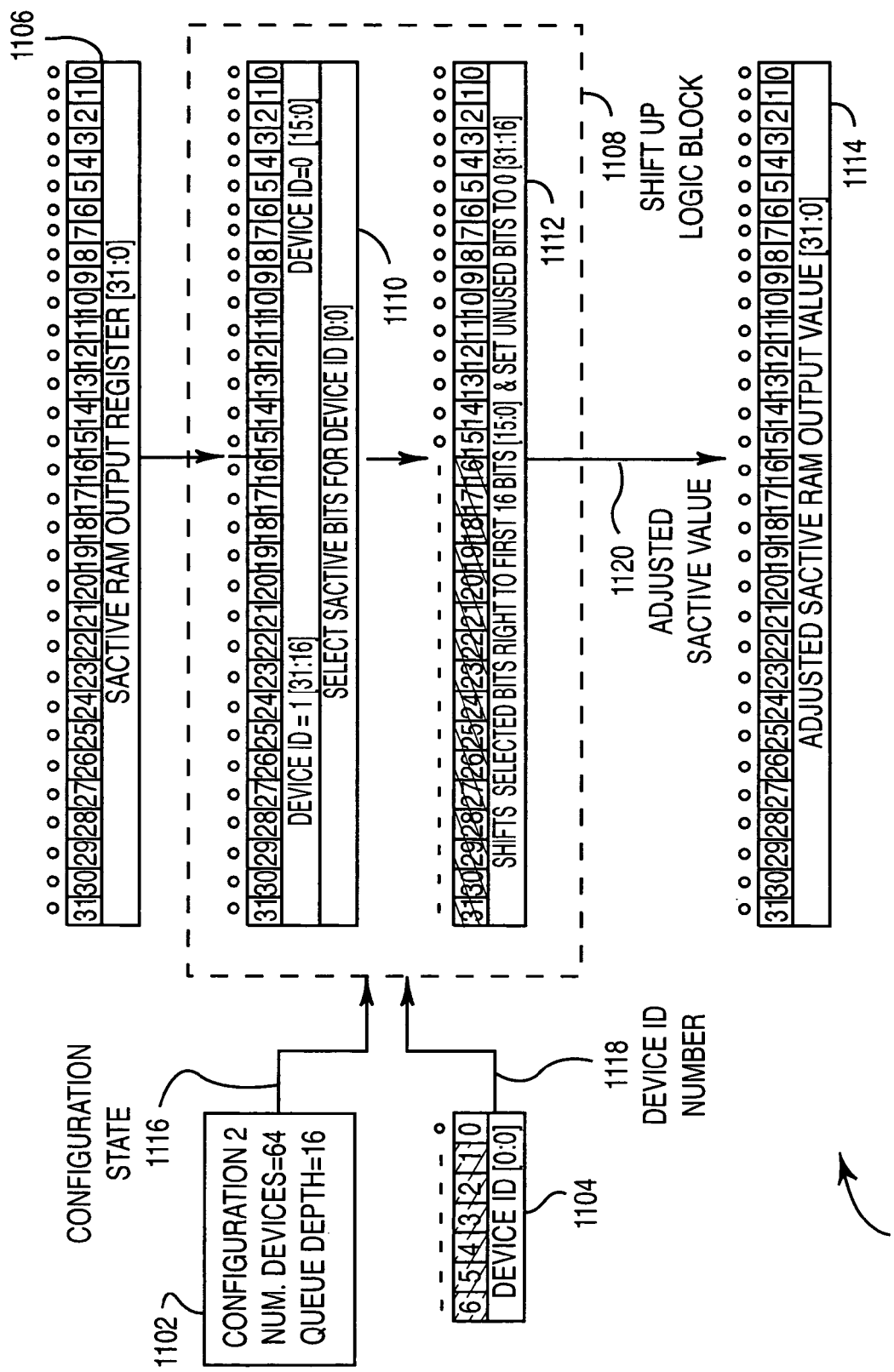
FIG. 11 is a schematic diagram illustrating the specific bit manipulation method used in the shift up logic block for a second configuration state of the embodiment illustrated in FIG. 5.

FIG. 11 is a schematic diagram 1100 illustrating the specific bit manipulation method used in the shift up logic block for a second configuration state of the embodiment illustrated in FIG. 5, 526. For preset configuration state two (1102, 1116) only sixteen bits, or half, of the thirty-two bit SActive RAM output register 1106 are used to hold the SActive status bits of queued commands available for a single SATA end device. The first LSB of the device identification 1104, 1118 is needed to determine which sixteen bits of the SActive RAM output register 1106 contain the SActive status bits for the selected SATA end device. The shift up logic block 1108 selects the correct sixteen bits 1110 from the SActive RAM output register 1106 based on the value of the first LSB of the device identification 1104, 1118. If necessary, the selected bits 1112 are shifted right so the selected bits 1112 are held in the sixteen LSB of the thirty-two bit value 1112. The leftmost sixteen MSB of the thirty-two bit value 1112 are set to zero to insure that the sixteen unused command queues do not falsely appear active. The adjusted SActive RAM value 1120 is stored in the adjusted SActive RAM output register 1114 to be used by other blocks of the SAS host controller.

Figure 12:
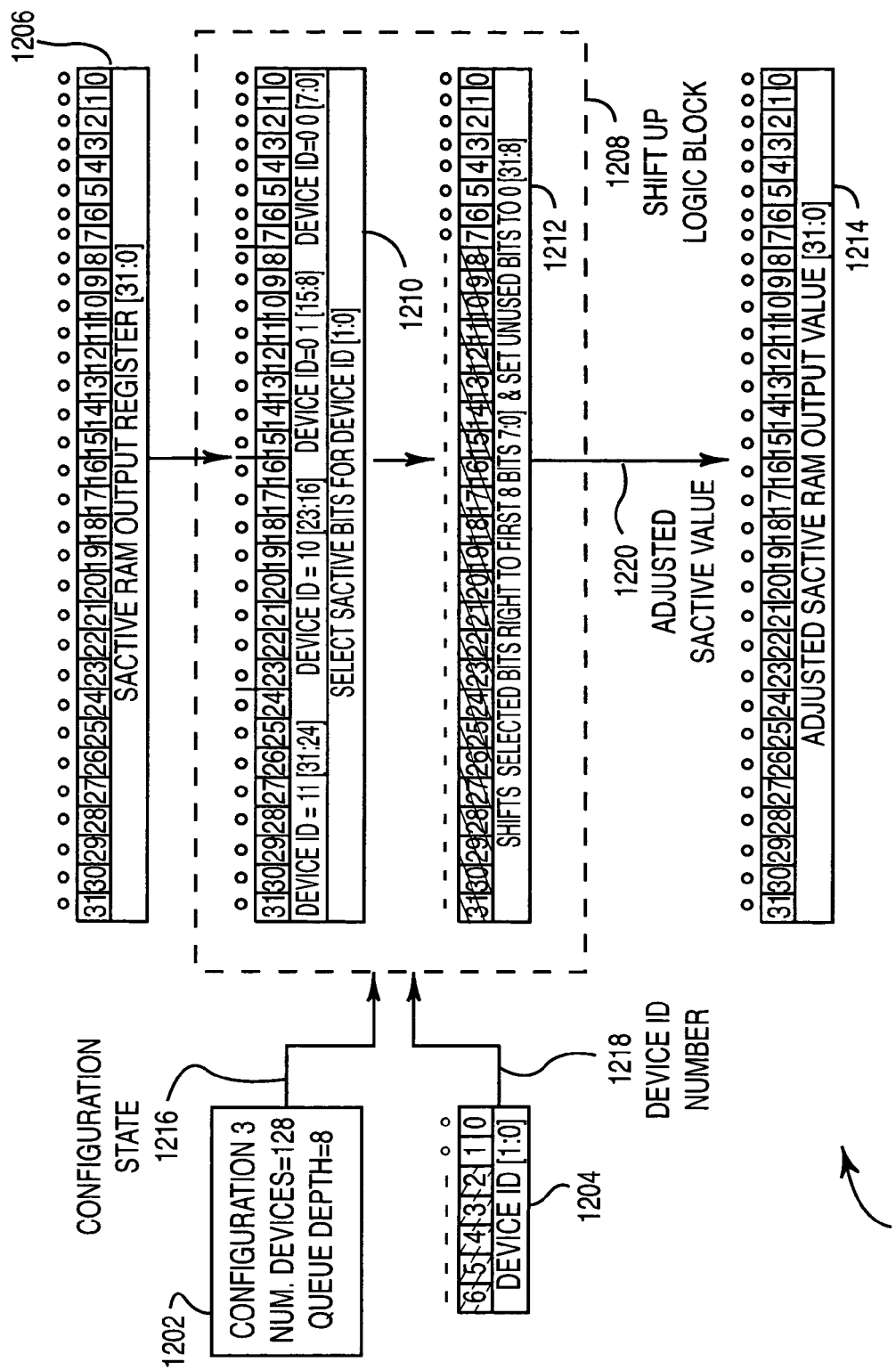
FIG. 12 is a schematic diagram illustrating the specific bit manipulation method used in the shift up logic block for a third configuration state of the embodiment illustrated in FIG. 5.

FIG. 12 is a schematic diagram 1200 illustrating the specific bit manipulation method used in the shift up logic block for a third configuration state of the embodiment illustrated in FIG. 5, 526. For preset configuration state three (1202, 1216) only eight bits, or one-quarter, of the thirty-two bit SActive RAM output register 1206 are used to hold the SActive status bits of queued commands available for a single SATA end device. The two LSB of the device identification input 1204, 1218 are needed to determine which eight bits of the SActive RAM output register 1206 hold the SActive status bits of the selected SATA end device. The shift up logic block 1208 selects the correct eight bits 1210 from the SActive RAM output register 1206 based on the value of the two LSB of the device identification 1204, 1218. If necessary, the selected bits 1212 are shifted right so the selected bits 1212 are held in the eight LSB of the thirty-two bit value 1212. The leftmost twenty-four MSB are set to zero 1212 to insure that the twenty-four unused command queues do not appear active. The adjusted SActive RAM value 1220 is stored in the adjusted SActive RAM output register 1214 to be used by other blocks of the SAS host controller.

The embodiment that is disclosed with respect to the descriptions of FIG. 4-12 may be varied, and does not necessarily need to be processed in the order illustrated. By adding more memory, the total number of devices supported for any state can be increased accordingly. The NC queue depth can also be adjusted to a smaller value allowing additional preset configuration states. While using powers of two is a logical breakdown for changing states, using powers of two is not necessary for creating additional configuration states. In other words, instead of the number of devices and the NC queue depth values being a power of two, the numbers could be any value, such as twenty-three. Additionally, it is not necessary that all of the SATA end devices have a uniform queue depth. For instance, one SATA end device may have a NC queue depth of twenty-nine and three other SATA end devices may have a NC queue depth of one, thus, still achieving the four to one memory savings of configuration state three of the embodiment that is disclosed with respect to the descriptions of FIG. 4-12, specifically with respect to the division of bits among the four devices for a single array entry of configuration three (806) illustrated in FIG. 8. It is also logical to arrange the memory in sequential format as disclosed in more detail with respect to the descriptions of FIG. 6 and FIG. 8, but it is not required. Arranging the data as a hash table, or in an order to support a binomial search are two other common arrangements. Any common data storage scheme may be used, but since the index can be computed there is little advantage to these other data arrangements which are typically used to assist ad hoc searches. The logic to create the table indexes and perform the shift up logic would also need to be adjusted to perform properly with a different memory architecture, but the configuration and memory savings would remain the same as with the embodiment illustrated and discussed herein. The present invention, therefore, provides a unique method to allow a single device with fixed memory to support multiple disparate systems where the system user can make the decision between having a high number of devices, or a large NC queue depth.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of using a Serial Attached SCSI (Small Computer System Interface) (SAS) host controller having a fixed predetermined amount of memory and predetermined computational resources to manage a plurality of Serial Advanced Technology Attachment (SATA) end devices comprising:

creating a plurality of preset configurations that establish a number of said SATA end devices supported by said SAS host controller and a native command queue depth of each of said SATA end devices so that said fixed predetermined amount of memory is allocated based on said number of said SATA end devices and said native command queue depth of each of said SATA end devices;

selecting a preset configuration from said plurality of preset configurations in accordance with a desired number of said plurality of SATA end devices that are connected to said SAS host controller thereby maximizing said number of said SATA end devices for said fixed predetermined amount of memory; and managing said plurality of SATA end devices with said SAS host controller having said fixed predetermined amount of memory and having said predetermined computational resources in accordance with said selected preset configuration.

2. The method of claim 1 further comprising:
providing a memory architecture to store data for said plurality of SATA end devices;
computing indexes into said memory architecture to retrieve data for a SATA end device.

3. The method of claim 2 further comprising:
providing a memory array of native command pointers for said plurality of SATA end devices in said SAS host controller;
providing a device identification number for each said SATA end device;
providing a native command queue command identifier for each outstanding command in a native command queue for each said SATA end device;

providing a configuration state of said SAS host controller;
addressing said memory array of native command pointers by computing a tag table index using said device identification number, said native command queue command identifier, and said configuration state;
obtaining a native command pointer stored at said tag table index in said memory array of native command pointers;
providing said native command pointer to said SAS host controller;
providing a memory array of SActive values wherein each SActive value is a block of native command queue status bits;
addressing said memory array of SActive values by computing a SActive RAM table index using said device identification number and said configuration state;
obtaining a chosen SActive value stored at said SActive RAM table index from said memory array of SActive values;
providing a plurality of subdivisions of said chosen SActive value;
selecting a subdivision of said chosen SActive value using said device identification number and said configuration state;
adjusting said subdivision of said chosen SActive value so said subdivision is in the least significant bit portion of said chosen SActive value;
setting all bits in said chosen SActive value not in said subdivision to zero to create an adjusted SActive value; and
providing said adjusted SActive value to said SAS host controller.

4. A Serial Attached SCSI (Small Computer System Interface) (SAS) host controller device having a predetermined amount of memory and predetermined computational resources that controls a plurality of Serial Advanced Technology Attachment (SATA) end devices comprising:

a multiplexer that generates a tag table index which is the concatenation of a device identification number identifying a SATA end device, and a native command queue command identifier representing a native command currently queued in a native command queue of said SATA end device, in accordance with a selected preset configuration state provided by a configuration register so as to generate a concatenated tag table index signal;

a native command pointer array that selects a native command pointer that is stored in said native command pointer array in response to said concatenated tag table index signal so as to deliver said native command pointer to said SAS host controller device;

a multiplexer that generates a SActive RAM table index which is a subset of said device identification number identifying said SATA end device, said subset of said device identification number determined in accordance with said selected preset configuration state provided by said configuration register so as to generate a SActive RAM table index signal;

an array of SActive values that selects a chosen SActive value that is stored in said array of SActive values in response to said SActive RAM table index signal, wherein each SActive value of said array of SActive values is a block of native command queue status bits; and a logic algorithm that generates an adjusted SActive value which is a subset of the bits of said chosen SActive value, said subset of the bits of said chosen SActive value determined in accordance with said device identification number and said preset configuration state provided by said configuration register, wherein said subset of bits of said chosen SActive value is shifted to the least significant bits of said chosen SActive value and the remaining bits of said chosen SActive value are given zero values so as to deliver said adjusted SActive value to said SAS host controller device.

* * * * *